United States Patent
Matsuoka et al.

(10) Patent No.: US 8,690,227 B2
(45) Date of Patent: Apr. 8, 2014

(54) LOWER VEHICLE-BODY STRUCTURE OF VEHICLE

(71) Applicant: Mazda Motor Corporation, Hirshoma (JP)

(72) Inventors: Hidenori Matsuoka, Hiroshima (JP); Akiyoshi Masuda, Hiroshima (JP); Keizo Kawasaki, Hiroshima (JP); Masanobu Fukushima, Higashihiroshima (JP); Atsushi Kawamoto, Hiroshima (JP); Hiromasa Honji, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/747,211

(22) Filed: Jan. 22, 2013

(65) Prior Publication Data
US 2013/0200650 A1 Aug. 8, 2013

(30) Foreign Application Priority Data

Feb. 8, 2012 (JP) .................................. 2012-024833

(51) Int. Cl.
*B62D 25/00* (2006.01)

(52) U.S. Cl.
USPC ............ 296/187.09; 296/187.12; 296/193.05; 296/193.09; 296/30

(58) Field of Classification Search
USPC .................. 296/29, 30, 193.06, 209, 187.12, 296/187.09, 193.05, 193.07, 205, 203.02, 296/203.03
See application file for complete search history.

(56) References Cited

U.S. PATENT DOCUMENTS

| | | | | |
|---|---|---|---|---|
| 8,029,050 | B2 * | 10/2011 | Tamakoshi | 296/203.01 |
| 2007/0187995 | A1 * | 8/2007 | Mouch et al. | 296/209 |
| 2008/0315627 | A1 * | 12/2008 | Marks et al. | 296/193.06 |

FOREIGN PATENT DOCUMENTS

| JP | 6-263062 | * | 9/1994 |
|---|---|---|---|
| JP | 07-089450 A | | 4/1995 |
| JP | 2005-193843 A | | 7/2005 |
| JP | 2007-203893 A | | 8/2007 |

* cited by examiner

*Primary Examiner* — Joseph Pape
(74) *Attorney, Agent, or Firm* — Studebaker & Brackett PC

(57) ABSTRACT

A gusset member which is provided in back of a front wheel and connects a dash panel and a hinge pillar is provided. A first reinforcing member which is connected to the gusset member to reinforce a lower portion of the hinge pillar is provided. Accordingly, a cabin deformation of a vehicle side portion as a whole can be properly restrained, thereby ensuring a sufficient space of a vehicle compartment.

3 Claims, 12 Drawing Sheets

LOWER VEHICLE-BODY STRUCTURE OF VEHICLE

BACKGROUND OF THE INVENTION

The present invention relates to a lower vehicle-body structure of a vehicle which can improve the performance against an offset frontal collision of the vehicle, and, in particular, relates to a lower vehicle-body structure of a vehicle comprising a dash panel which extends in a vehicle width direction, a hinge pillar which is connected to an end portion, in the vehicle width direction, of the dash panel, a side sill which is connected to a lower portion of the hinge pillar and extends in a vehicle longitudinal direction, and a floor panel which is connected to the side sill.

In general, in an offset frontal collision of a vehicle, particularly, in a small overlap collision (in an offset collision on the outside, in a vehicle width direction, of a pair of right-and-left front side frames), vehicle's tires retreat, so that a hinge pillar as well as a side sill deform. Accordingly, some countermeasures for the small overlap collision has been desired. Japanese Patent Laid-Open Publication No. 2005-193843, Japanese Patent Laid-Open Publication No. H7-89450, and Japanese Patent Laid-Open Publication No. 2007-203893 disclose conventional structures to improve the collision performance.

The one of the conventional structures disclosed in the above-described first patent publication is such that a dash cross member which extends in the vehicle width direction is provided at a vehicle-inside lower portion of the dash panel, and a gusset member which connects the dash cross member to a hinge pillar and a side sill is provided, so that the hinge pillar can be prevented from falling inward in a side collision of a vehicle, thereby improving the performance against the vehicle's side collision.

The one of the conventional structures disclosed in the above-described second patent publication is such that a connection portion between a hinge pillar extending vertically and a side sill extending longitudinally is reinforced by a reinforcing member which is formed in an L shape in a side view, so that the connection portion can be prevented from deforming in a frontal collision of a vehicle, thereby improving the performance of the vehicle's frontal collision.

The one of the conventional structures disclosed in the above-described third patent publication is such that in a side sill having a closed cross section extending in the vehicle longitudinal direction, a front reinforcement which has a L-shaped cross section and extends longitudinally is provided between a lower portion of a hinge pillar and a lower portion of a center pillar, and a rear reinforcement is arranged such that its front portion overlaps the front reinforcement and the rear reinforcement is directed further rearward from the lower portion of the center pillar, so that the side sill can be prevented from bending in an offset frontal collision of a vehicle, thereby improving the performance of the vehicle's offset frontal collision.

However, none of the above-described first, second and third patent publications discloses or teaches any structure to restrain an overall cabin deformation on the side of a vehicle's side portion in the offset frontal collision of a vehicle (particularly, in the small overlap collision).

SUMMARY OF THE INVENTION

An object of the present invention is to provide a lower vehicle-body structure of a vehicle which can restrain the overall cabin deformation on the side of the vehicle's side portion in the offset frontal collision of the vehicle (particularly, in the small overlap collision), thereby ensuring a vehicle-compartment space.

According to the present invention, there is provided a lower vehicle-body structure of a vehicle, comprising a dash panel extending in a vehicle width direction, a hinge pillar connected to an end portion, in the vehicle width direction, of the dash panel, a side sill connected to a lower portion of the hinge pillar and extending in a vehicle longitudinal direction, a floor panel connected to the side sill, a gusset member provided in back of a front wheel and connecting the dash panel and the hinge pillar, and a first reinforcing member connected to the gusset member to reinforce the lower portion of the hinge pillar.

According to the present invention, since the gusset member connecting the dash panel and the hinge pillar is provided and the first reinforcing member which is connected to the gusset member and reinforce the lower portion of the hinge pillar is provided, the hinge pillar and the side sill can be prevented from being displaced rearward by the gusset member and the first reinforcing member in the offset frontal collision (particularly, in the small overlap collision). Accordingly, the overall cabin deformation on the side of the vehicle's side portion can be restrained in the offset frontal collision of the vehicle, thereby ensuring a vehicle-compartment space.

According to an embodiment of the present invention, the first reinforcing member comprises an upper-side reinforcing member which is connected to an upper-side connection portion of the gusset member via a fastening member and arranged on an outward side, in the vehicle width direction, inside the hinge pillar and connected to the side sill, and a lower-side reinforcing member which is connected to a lower-side connection portion of the gusset member via a fastening member and connected to the side sill. Thereby, the reinforcement effect of the hinge pillar can be increased by the upper-side reinforcing member and the lower-side reinforcing member that constitute the first reinforcing member. Further, the upper-side reinforcing member connects the gusset member, the hinge pillar and the side sill, and the lower-side reinforcing member also connects the gusset member, the hinge pillar and the side sill. Accordingly, the connection strength of the hinge pillar, the side sill and the dash panel is increased, thereby restraining a separate deformation of the hinge pillar and the side sill in the offset collision.

According to another embodiment of the present invention, the lower vehicle-body structure of a vehicle further comprises a second reinforcing member which is arranged in the vehicle longitudinal direction along the side sill and joints an inside frame member of the side sill and the floor panel. Thereby, it can be prevented by the second reinforcing member that a joint portion of the side sill and the floor panel is disconnected. Accordingly, the overall cabin deformation on the side of the vehicle's side portion can be more properly restrained in the offset frontal collision of the vehicle, thereby ensuring the vehicle-compartment space.

According to another embodiment of the present invention, the lower vehicle-body structure of a vehicle further comprises a third reinforcing member which is arranged in the vehicle longitudinal direction at the side sill, the third reinforcing member including an inside reinforcing member which is arranged longitudinally along an inner face of an upper-side corner portion of an inside frame member of the side sill and forms a closed cross section together with the inside frame member of the side sill. The above-described third reinforcing member can properly prevent deformation of the side sill and increase performances of transmission and dispersion of a collision load in the offset frontal collision.

According to another embodiment of the present invention, a first closed cross section is formed by the gusset member and the hinge pillar, a second closed cross section is formed by the first reinforcing member and the hinge pillar, and a third closed cross section is formed by the inside reinforcing member and the side sill, respectively, in a sectional view perpendicular to a longitudinal direction of the side sill, and the first, second and third closed cross sections are overlapped in the vehicle longitudinal direction. Thereby, the rigidity can be further increased.

Herein, it is preferable that the above-described third reinforcing member include an outside reinforcing member which is arranged longitudinally along an outside frame member of the side sill and connected to the upper-side reinforcing member.

According to another embodiment of the present invention, the lower vehicle-body structure of a vehicle further comprises a front pillar extending upward and rearward from an upper end portion of the hinge pillar and a fourth reinforcing member arranged inside the front pillar. Thereby, the fourth reinforcing member can restrain deformation (bending buckling deformation) of the front pillar in the offset collision, and also restrain the hinge pillar from falling rearward and inward, thereby ensuring the vehicle-compartment space.

Other features, aspects, and advantages of the present invention will become apparent from the following description which refers to the accompanying drawings.

DETAILED DESCRIPTION OF THE INVENTION

Figure 1:
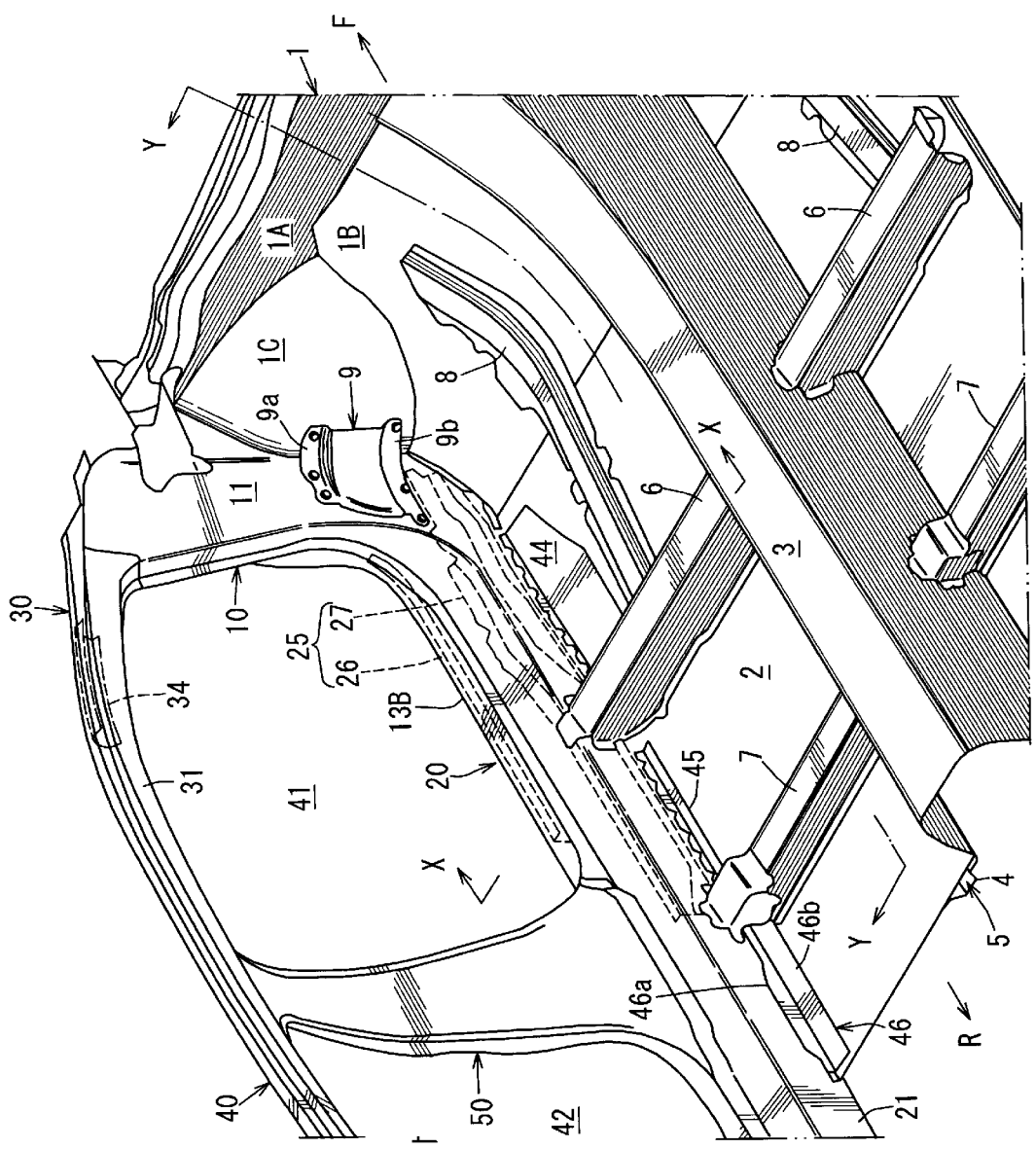
FIG. 1 is a perspective view showing a lower vehicle-body structure of a vehicle of the present invention.
Figure 2:
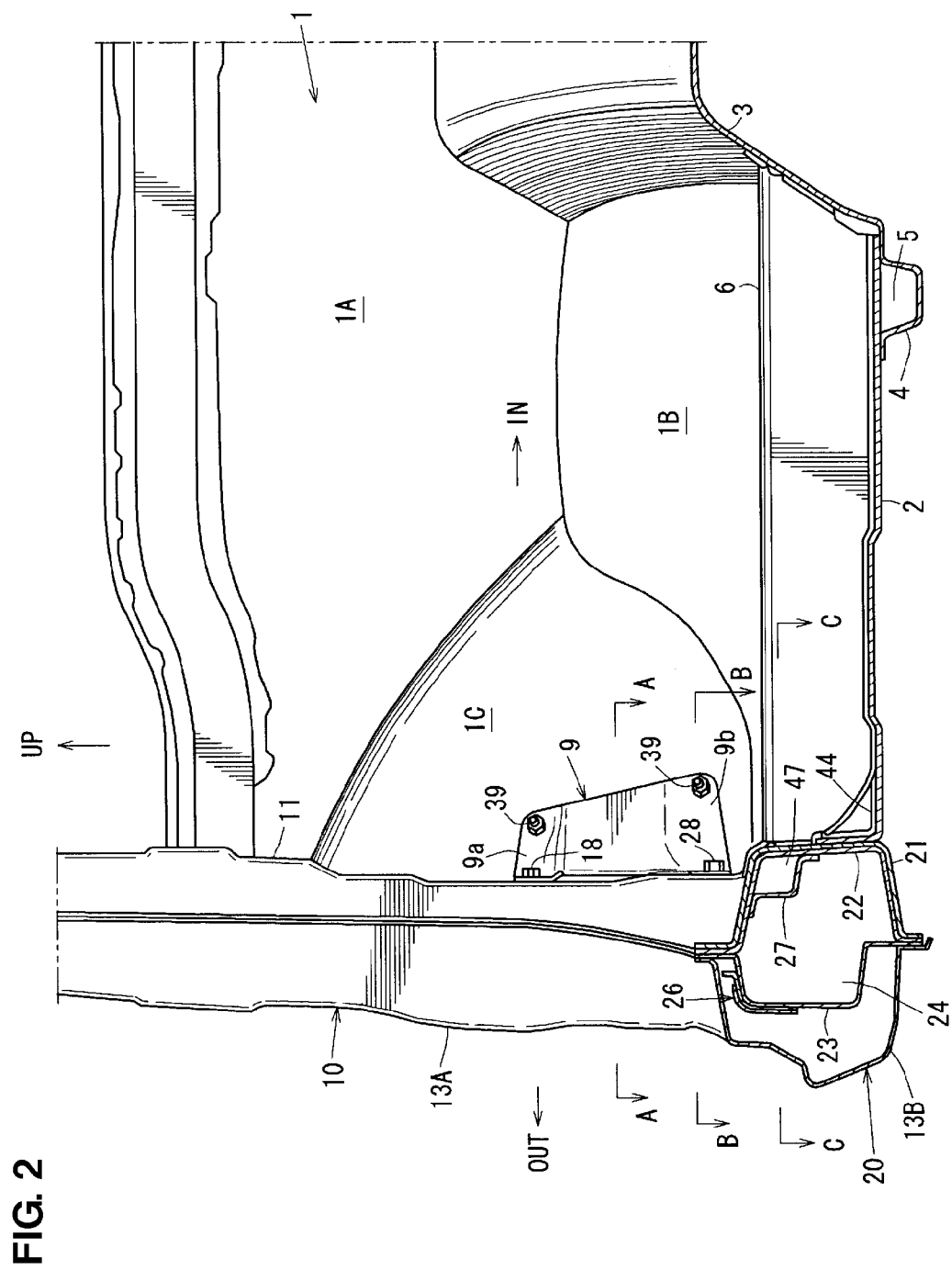
FIG. 2 is a sectional view taken along line X-X of FIG. 1.
Figure 3:
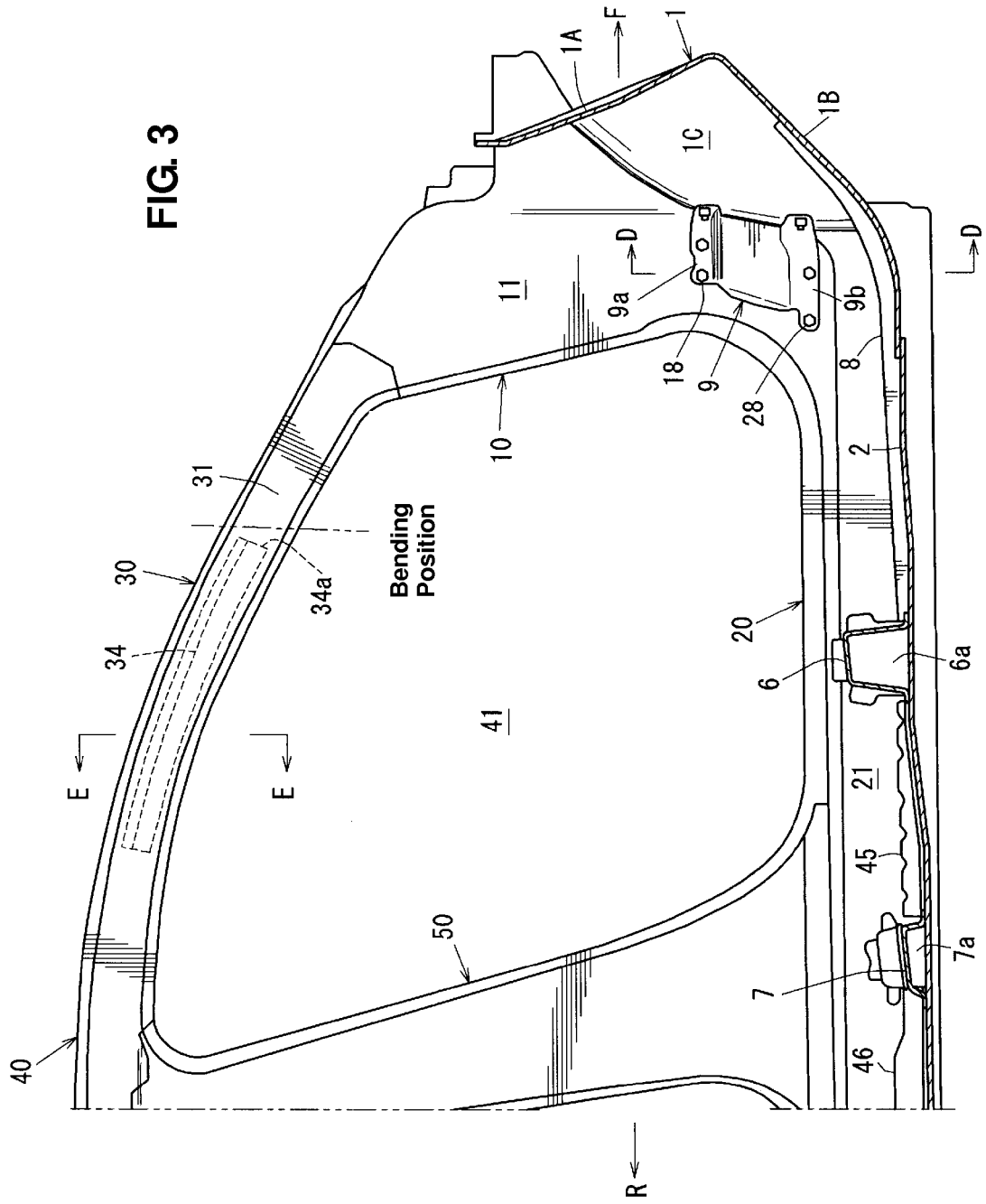
FIG. 3 is a sectional view taken along line Y-Y of FIG. 1.

Hereafter, a preferred embodiment of the present invention will be descried specifically referring to the accompanying drawings. The figures show a lower vehicle-body structure of a vehicle, and FIG. 1 is a perspective view of a whole of the structure, FIG. 2 is a sectional view taken along line X-X of FIG. 1 (back view), and FIG. 3 is a sectional view taken along line Y-Y of FIG. 1 (side view). In FIGS. 1-3, a dash panel (dash lower panel) 1 which longitudinally partitions a vehicle compartment from an engine room and extends in a vehicle width direction is provided. The dash panel 1 is formed by a first slant portion 1A which is provided on an upper side to slant upward, a second slant portion 1B which is provided on a lower side to slant downward, and a pair of wheel arch portions 1C which forms part of a pair of wheel houses.

A floor panel 2 is formed integrally with a lower portion of the dash panel 1 and extends rearward and substantially horizontally. The floor panel 2, which is a panel member to form a bottom face of the vehicle compartment, has a tunnel portion 3 at its central portion in the vehicle width direction. The tunnel portion 3 projects toward the inside of the vehicle compartment and extends in a vehicle longitudinal direction.

A tunnel member 4 is integrally formed at a lower portion of a side wall portion of the tunnel portion 3. The tunnel member 4 has a U-shaped cross section, extends in the vehicle longitudinal direction, and is fixedly joined to a lower face of the floor panel 2. A closed cross section 5 which extends longitudinally is formed between the floor panel 2 and the tunnel member 4.

As shown in FIGS. 1-3, a pair of hinge pillars 10 is connected to left-and-right both end portions, in the vehicle width direction, of the dash panel 1 (herein, the figures illustrate its left-side end portion only). The hinge pillar 10 is a vehicle-body reinforcing member which extends vertically. A side sill 20 is connected to a lower portion of the hinge pillar 10 such that the side sill 20 extends longitudinally rearward from the lower portion of the hinge pillar 10. The side sill 20 is a vehicle-body reinforcing member which extends in the vehicle longitudinal direction.

A front pillar 30 is connected to an upper portion of the hinge pillar 10 such that the front pillar 30 extends upward and rearward from an upper end portion of the hinge pillar 10, and a roof side rail 40 is connected to a rear portion of the front pillar 30 such that the roof side rail 40 extends rearward. The front pillar 30 and the roof side rail 40 are a vehicle-body reinforcing member, respectively. Additionally, a center pillar 50 having a closed cross section is provided to vertically connect the roof side rail 40 of the upper-side vehicle-body reinforcing member and the side sill 20 of the lower-side vehicle-body reinforcing member. Further, an ingress-and-egress space for front-seat passenger 41 is formed by being enclosed with the hinge pillar 10, the front pillar 30, the center pillar 50, and the side sill 20, and an ingress-and-egress space for rear-seat passenger 42 is formed by being enclosed with the roof side rail 40, the center pillar 50, the side sill 20, and a rear pillar or a quarter pillar, not illustrated.

As shown in FIGS. 1 and 3, a cross member 6 is provided between the side sill 20 and a side wall portion of the tunnel portion 3 to be joined to the floor panel 2 and extend in the vehicle width direction, corresponding to the ingress-and-egress space for front-seat passenger 41. Thereby, a closed cross section 6a extending in the vehicle width direction is formed between the floor panel 2 and the cross member 6, so that the rigidity of a lower vehicle-body portion is improved.

Likewise, a cross member 7 is provided, in parallel to the cross member 6, between the side sill 20 and the side wall portion of the tunnel portion 3 to be joined to the floor panel 2 and extend in the vehicle width direction, corresponding to the center pillar 50. Thereby, a closed cross section 7a extending in the vehicle width direction is formed between the floor panel 2 and the cross member 7, so that the rigidity of the lower vehicle-body portion is improved. Further, a floor reinforcement 8 having a closed cross section cross member is fixedly joined to a middle portion in the vehicle width direction between the tunnel portion 3 and the side sill 20, extending between the floor panel 2 and the second slant portion 1B of the dash panel 1. Thereby, a closed cross section extending in the vehicle longitudinal direction is formed between the floor reinforcement 8 and the members 2, 1B, so that the rigidity of a front vehicle-body portion is improved.

The above-described floor panel 2 is connected between a pair of right-and-left side sills 20, 20 via the tunnel portion 3

(the figures illustrate the left-side side sill only). As shown in FIGS. 1-3, there is provided a gusset member 9 which is positioned in back of the front wheel and connects a lower portion of the wheel arch portion 1C of the dash panel 1 and a lower portion of the hinge pillar 10.

Figure 4:
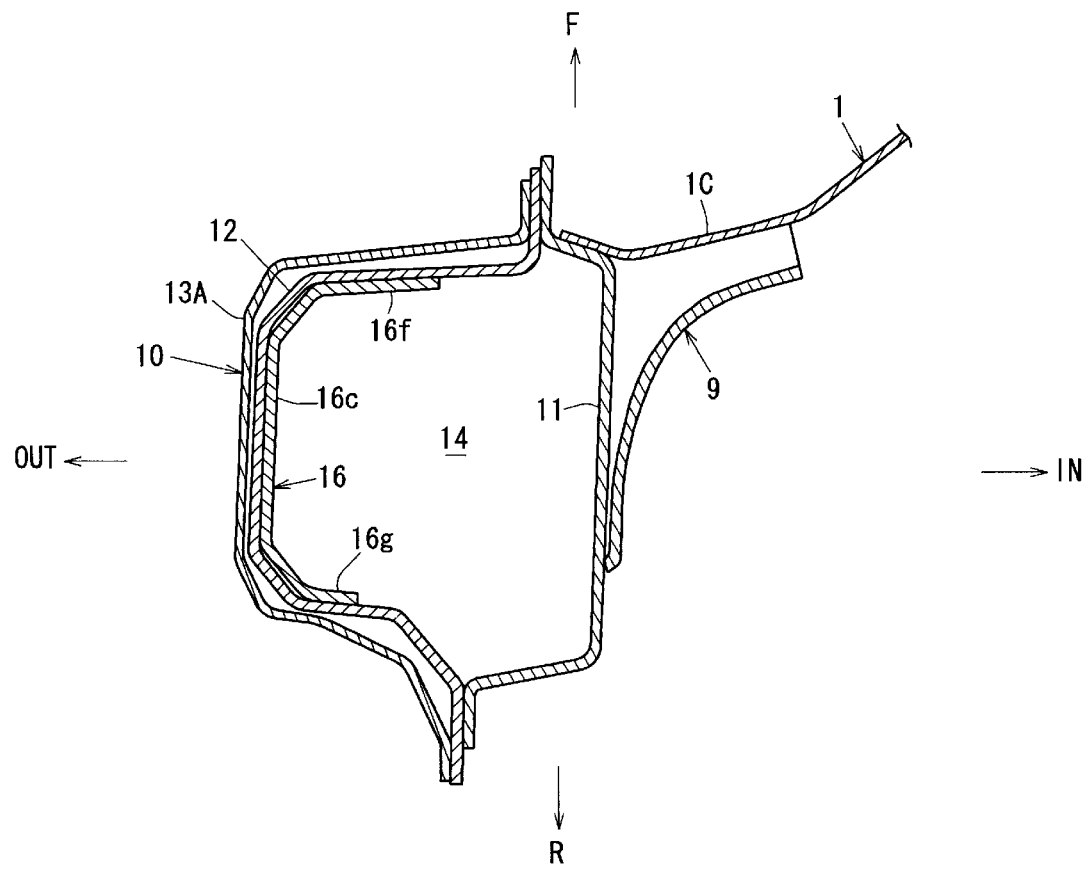
FIG. 4 is a sectional view taken along line A-A of FIG. 2.
Figure 5:
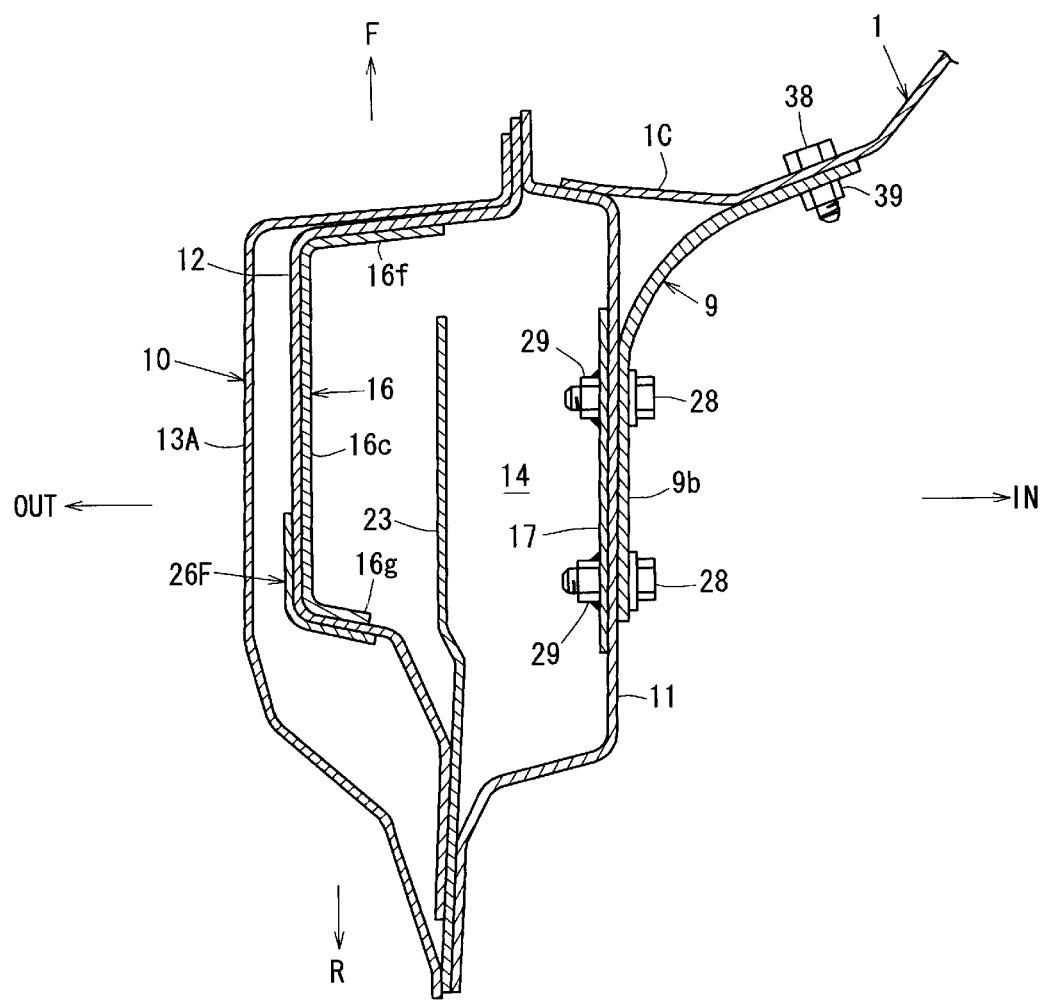
FIG. 5 is a sectional view taken along line B-B of FIG. 2.
Figure 6:
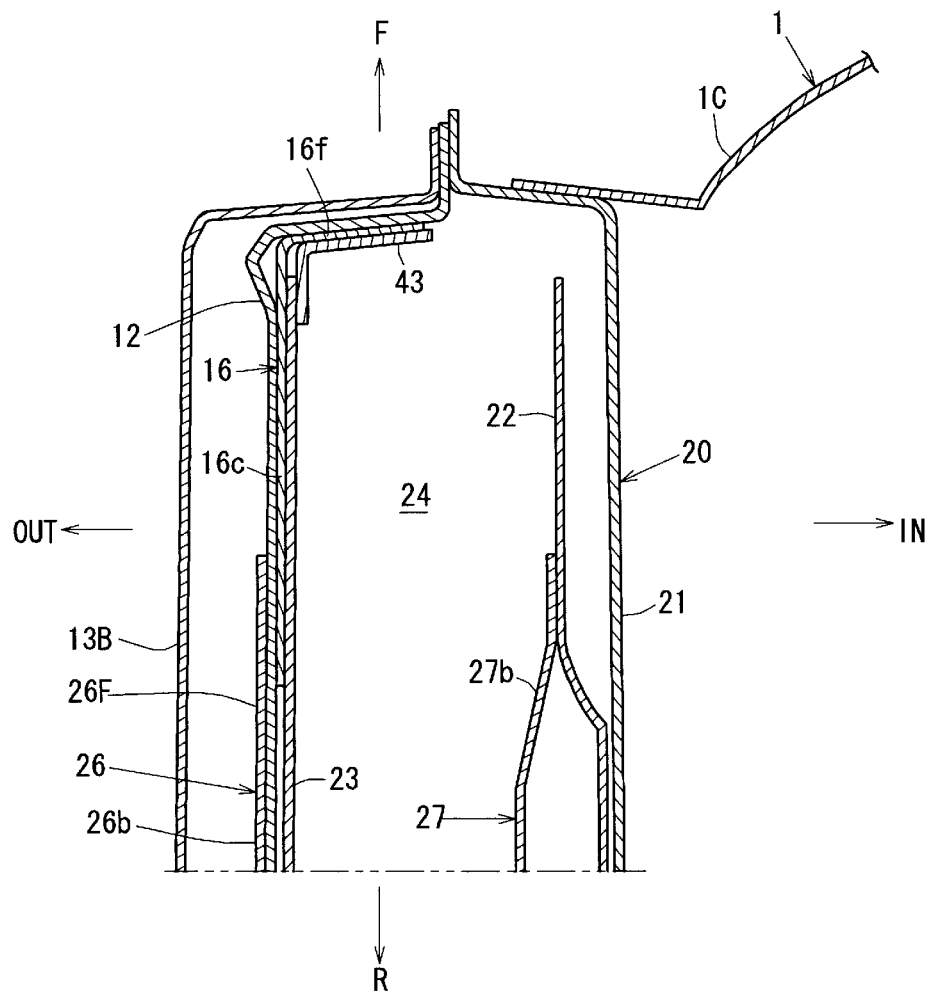
FIG. 6 is a sectional view taken along line C-C of FIG. 2.
Figure 7:
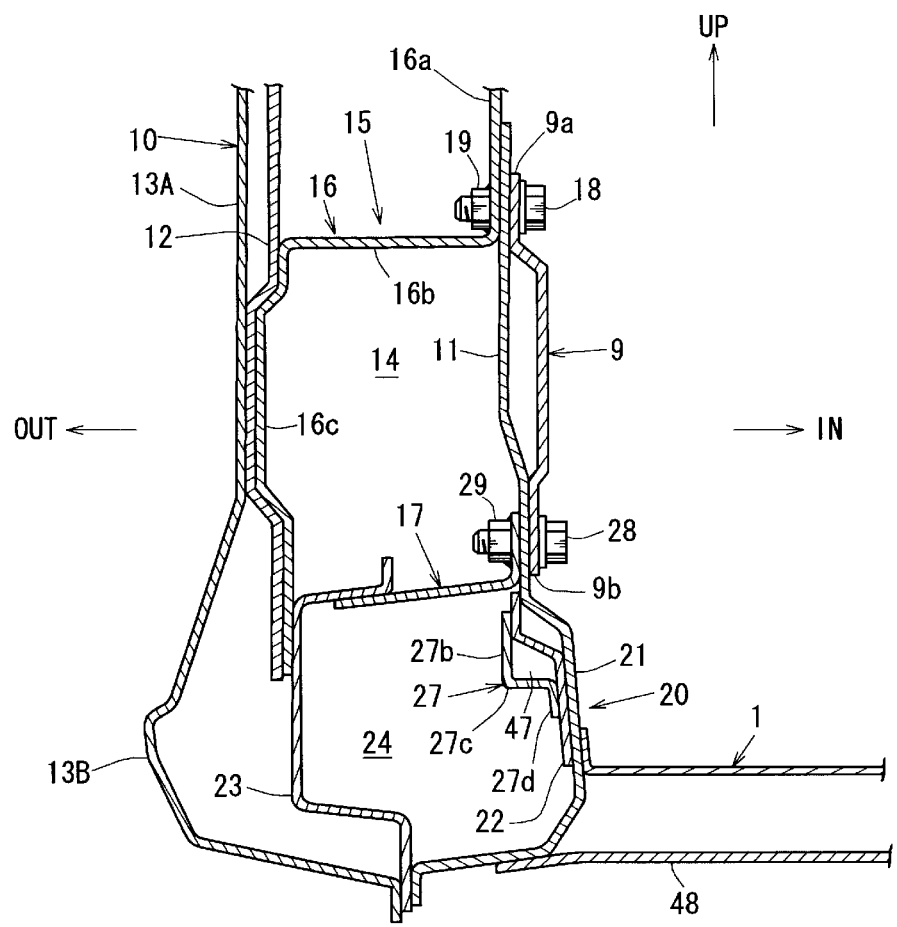
FIG. 7 is a sectional view taken along line D-D of FIG. 2.

FIG. 4 is a sectional view taken along line A-A of FIG. 2 (plan view), FIG. 5 is a sectional view taken along line B-B of FIG. 2 (plan view), FIG. 6 is a sectional view taken along line C-C of FIG. 2 (plan view), and FIG. 7 is a sectional view taken along line D-D of FIG. 2 (back view, when viewed forward from a vehicle-compartment side).

As shown in FIGS. 4 and 5, the above-described hinge pillar 10 is a vehicle-body rigidity member, which comprises an inner reinforcement 11, a hinge reinforcement 12 and a side frame outer 13A which are fixedly joined together via respective joint flange portions by means of spot welding, and has a hinge-pillar closed cross section 14 which extends vertically. The above-described inner reinforcement 11, hinge reinforcement 12 and side frame outer 13A are formed to have a U-shaped cross section, respectively, in a plan view.

As shown in FIGS. 2, 6 and 7, the above-described side sill 20 is another vehicle-body rigidity member, which comprises an inner reinforcement 21, a side sill inner 22, an outer reinforcement 23 and a side frame outer 13B which are fixedly joined together via respective joint flange portions by means of spot welding, and has a side-sill closed cross section 24 which extends in the vehicle longitudinal direction. The above-described inner reinforcement 21, side sill inner 22, outer reinforcement 23 and side frame outer 13B are formed to have a U-shaped cross section, respectively, in a back view.

The inner reinforcement 11 of the hinge pillar 10 and the inner reinforcement 21 of the side sill 20 are formed integrally. That is, the inner reinforcement 11 is set to be a hinge-pillar inner reinforcement, and the inner reinforcement 21 is set to be a side-sill inner reinforcement. Further, the side frame outer 13A which forms an outer panel of the hinge pillar 10 and the side frame outer 13B which forms an outer panel of the side sill 20 are formed integrally.

Figure 8:
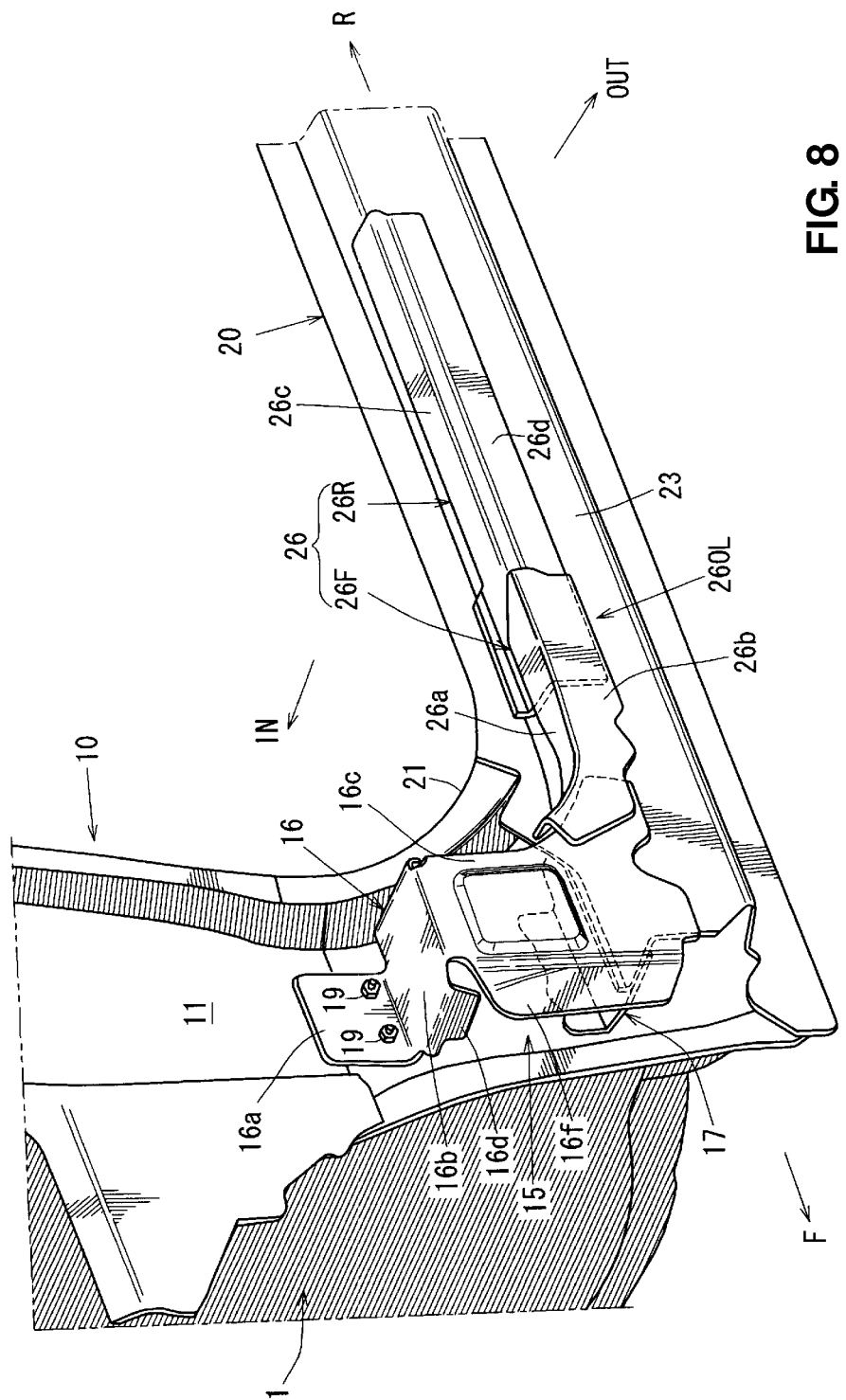
FIG. 8 is a perspective view of a major part of the structure in a state in which an outer plate and a hinge reinforcement are removed.

FIG. 8 is a perspective view of a major part of FIG. 7 in a state in which the side frame outers 13A, 13B and the hinge reinforcement 12 are removed. As shown in FIGS. 7 and 8, a first reinforcing member 15 to reinforce a lower portion of the hinge pillar 10 which is connected to the above-described gusset member 9 is provided. This first reinforcing member 15 is comprised of an upper-side reinforcing member 16 and a lower-side reinforcing member 17. The upper-side reinforcing member 15 is connected to an upper-side connection portion 9a of the gusset member 9 via plural bolts 18 and nuts 19 as a fastening member, and arranged on an outward side, in the vehicle width direction, inside the hinge pillar 10, a lower portion of which is connected to the outer reinforcement 23 of the side sill 20.

The lower-side reinforcing member 17 is connected to a lower-side connection portion 9b of the gusset member 9 via plural bolts 28 and nuts 29 as a fastening member, and connected to the outer reinforcement 23 of the side sill 20. This lower-side reinforcing member 17 is formed in an L shape in an elevational view as shown in FIGS. 7 and 8. As shown in FIGS. 3 and 5, a front portion of the gusset member 9 is connected to the wheel arch portion 1C of the dash panel 1 such that the upper-side connection portion 9a and the lower-side connection portion 9b are fastened to the wheel arch portion 1C via plural bolts 38 and nuts 39 as a fastening member.

Figure 9:
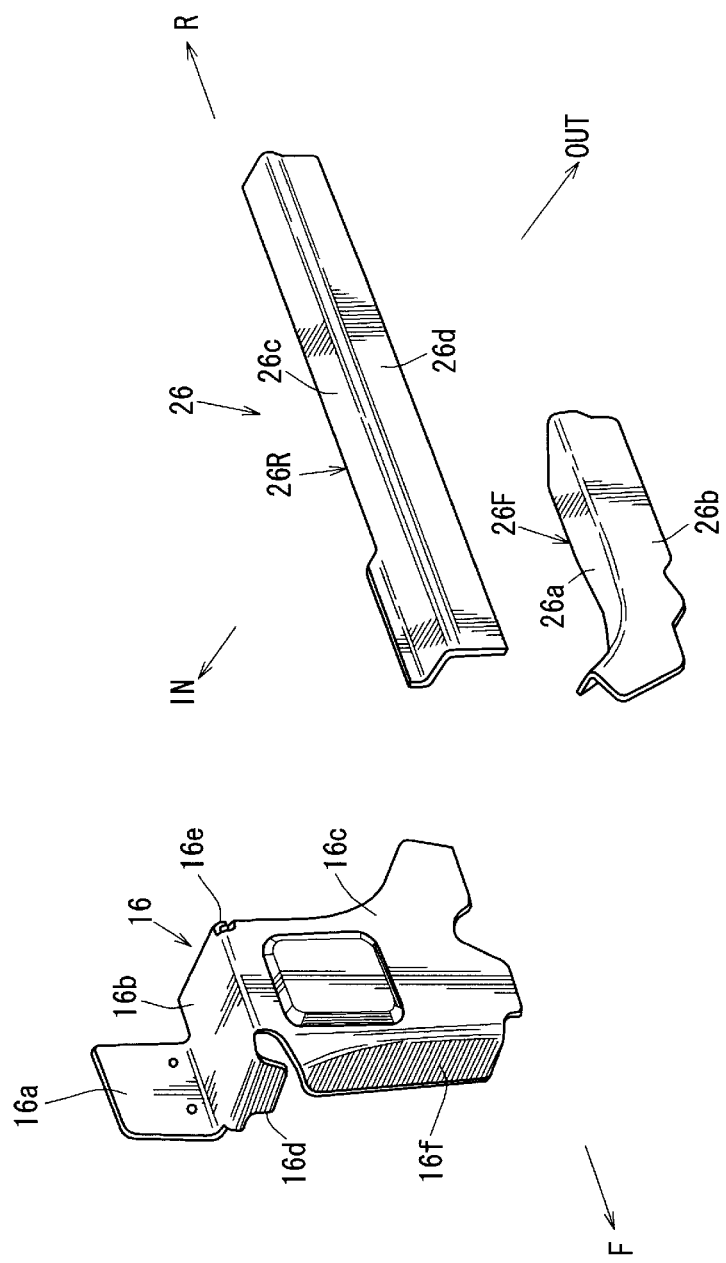
FIG. 9 is an exploded perspective view of a first reinforcing member and a third reinforcing member.

As shown in FIGS. 8 and 9, the upper-side reinforcing member 16 of the first reinforcing member 15 includes an attachment piece 16a which is fixedly fastened to an inner face of the inner reinforcement 11, a substantially-horizontal upper piece 16b which extends outward, in the vehicle width direction, from a lower end of the attachment piece 16a, a lower piece 16c which extends downward from an outward end, in the vehicle width direction, of the upper piece 16b and is connected to the hinge reinforcement 12 and the outer reinforcement 23 of the side sill 20, bending pieces 16d, 16e which bend downward from longitudinal both-end portions of the upper piece 16b, and bending pieces 16f, 16g which bend inward, in the vehicle width direction, from longitudinal both ends of the lower piece 16c (see FIG. 4). Herein, the lower piece 16c is arranged on an outward side, in the vehicle width direction, inside the hinge pillar 10.

As shown in FIG. 4 of the sectional view taken along line A-A of FIG. 2 and FIG. 5 of the sectional view taken along line B-B of FIG. 2, the lower piece 16c and the front and rear bending pieces 16f, 16g of the upper-side reinforcing member 16 are connected to the hinge reinforcement 12. Further, as shown in FIG. 6 of the sectional view taken along line C-C of FIG. 2, the lower piece 16c at the lower portion of the upper-side reinforcing member 16 is connected to the outer reinforcement 23 of the side sill 20. Moreover, as shown in FIG. 6, a front end portion of the outer reinforcement 23 of the side sill 20 and the bending piece 16f of the upper-side reinforcing member 16 are connected via a hinge lower gusset 43 having an L shape in the plan view, thereby ensuring the connection rigidity of these 23, 16.

Figure 10:
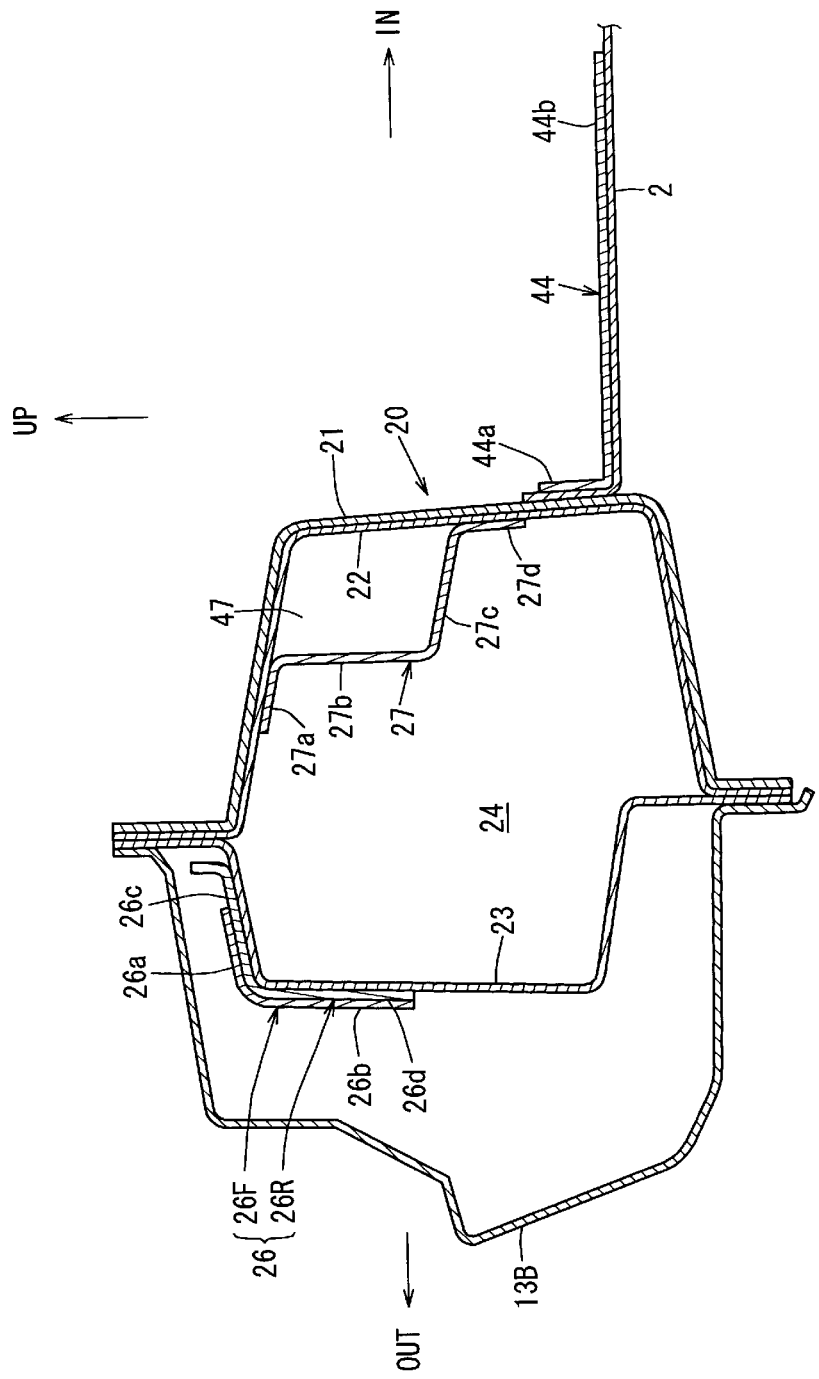
FIG. 10 is an enlarged sectional view of part of FIG. 2.

As shown in FIG. 1 and FIG. 10 which is an enlarged sectional view of a part of FIG. 2 (back view), plural second reinforcing members 44, 45, 46 are arranged longitudinally along the side sill 20, joining the inner reinforcement 21 as an inside frame member of the side sill 20 and the floor panel 2.

Figure 11:
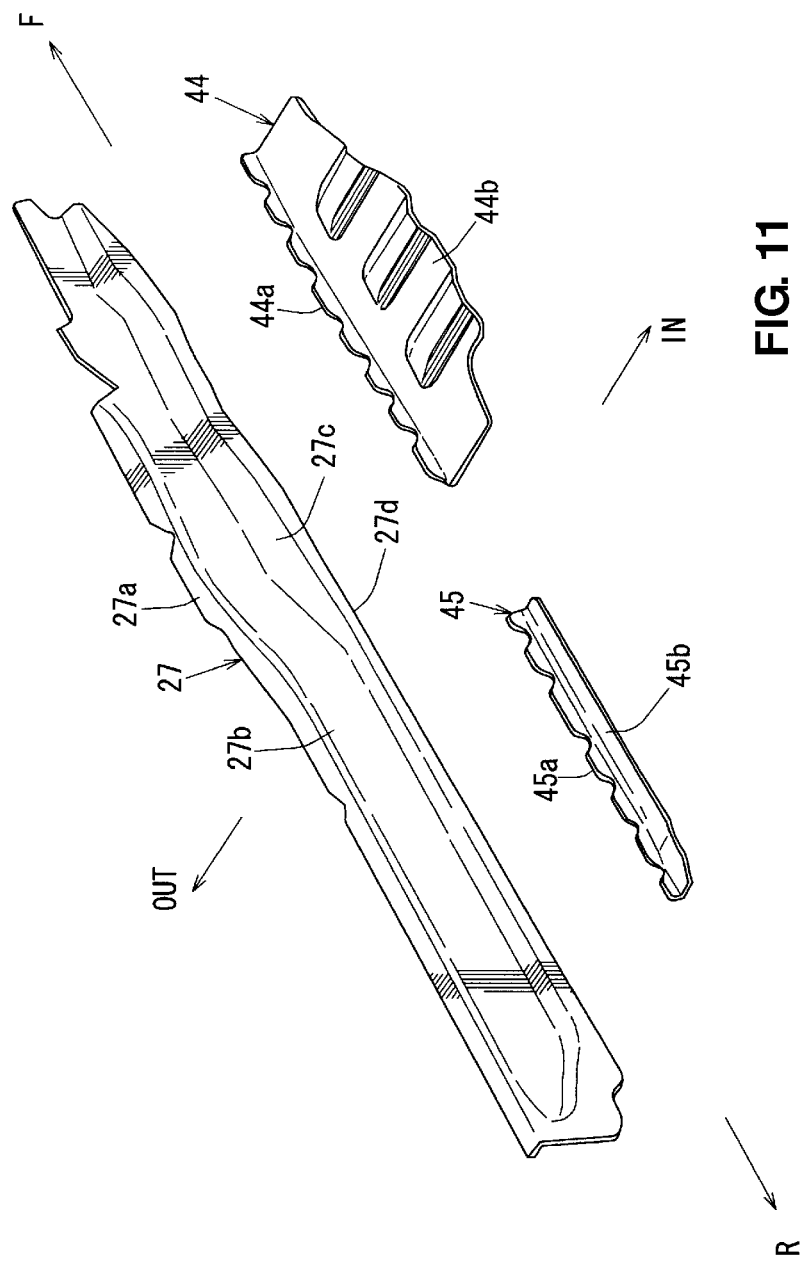
FIG. 11 is an exploded perspective view showing a second reinforcing member and an inside reinforcing member.

As shown in FIGS. 1, 10 and 11, the second reinforcing member 44 located on the front side of the plural second reinforcing members 44, 45, 46 includes a vertical wall portion 44a and a floor attachment portion 44b, which is formed in an L shape. The vertical wall portion 44a is fixedly joined to the inner reinforcement 21, and the floor attachment portion 44b is fixedly joined to the floor panel 2 in front of the cross member 6.

As shown in FIGS. 1, and 11, the second reinforcing member 45 located at the middle position of the plural second reinforcing members 44, 45, 46 includes a vertical wall portion 45a and a floor attachment portion 45b, which is formed in an L shape. The vertical wall portion 45a is fixedly joined to the inner reinforcement 21, and the floor attachment portion 45b is fixedly joined to the floor panel 2 in front of the cross member 7.

Likewise, as shown in FIG. 1, the second reinforcing member 46 located on the rear side of the plural second reinforcing members 44, 45, 46 includes a vertical wall portion 46a and a floor attachment portion 46b, which is formed in an L shape. The vertical wall portion 46a is fixedly joined to the inner reinforcement 21, and the floor attachment portion 46b is fixedly joined to the floor panel 2 which corresponds to a rear half part of the lower portion of the center pillar 50.

As shown in FIG. 1, a third reinforcing member 25 to improve performances of transmission and dispersion of a collision load in the offset frontal collision is provided at the side sill to extend longitudinally. The third reinforcing member 25 is comprised of an outside reinforcing member 26 (see FIGS. 8 and 9) and an inside reinforcing member 27 (see FIG. 11). In the present embodiment, as shown in a perspective view of FIG. 8, the outside reinforcing member 26 is comprised of two split parts, a front outside reinforcing member 26F and a rear outside reinforcing member 26R.

As shown in FIGS. 8 and 10, the outside reinforcing member 26 is arranged longitudinally along an outer face of an upper corner portion of the outer reinforcement 23 as an outside frame member of the side sill 20, and as shown in FIGS. 5 and 6, a front portion of the front outside reinforcing member 26F is connected to a lower portion of the upper-side reinforcing member 16 via the hinge reinforcement 12. Further, as shown in FIGS. 1, 7 and 10, the inside reinforcing member 27 is arranged longitudinally along an inner face of an upper corner portion of the side sill inner 22 as an inside frame member of the side sill 20, and forms a closed cross section 47 which extends longitudinally between the side sill inner 22 and the inside reinforcing member 27. That is, the side-sill closed cross section 24 and the closed cross section 47 are formed at the side sill 20. Thus, the rigidity of the side sill 20 is improved by this structure having double closed cross sections.

As shown in FIG. 8 showing a state in which the front and rear outside reinforcing members 26F, 26R are attached to the vehicle body and FIG. 9 of the exploded perspective view, the front outside reinforcing member 26F includes a substantially-horizontal upper piece 26a and a vertical wall portion 26b which extends downward from an outward side of the upper piece 26a, and is formed to have an L-shaped cross section. Its front portion is formed to curve upward, corresponding to a shape of a lower rear portion of the upper-side reinforcing member 16.

The rear outside reinforcing member 26R includes a substantially-horizontal upper piece 26c and a vertical wall portion 26d which extends downward from an outward side of the upper piece 26c, and is formed to have an L-shaped cross section. As shown in FIG. 8, the both outside reinforcing members 26F, 26R are attached to the vehicle body such that a front portion of the rear outside reinforcing member 26R and a rear portion of the front outside reinforcing member 26F are overlapped in the vehicle longitudinal direction. Further, the performances of transmission and dispersion of the collision load in the offset frontal collision is improved by the above-described outside reinforcing member 26, and an overlap portion 26OL formed by the above-described overlap layout is provided in the vicinity of the lower portion of the hinge pillar to improve a resistance force against the offset frontal collision.

As shown in FIG. 1, the inside reinforcing member 27 is arranged in the vehicle longitudinal direction from a position corresponding to the lower portion of the hinge pillar 10 to another position corresponding to the lower portion of the center pillar 50. This inside reinforcing member 27 comprises, as shown in FIGS. 10 and 11, an upper-side joint flange portion 27a which is joined to the side sill inner 22, a vertical wall portion 27b which extends downward from an inward side of the joint flange portion 27a, a lateral wall portion 27c which extends inward from a lower end of the vertical wall portion 27b, and a lower-side joint flange portion 27d which extends downward from an inward end of the lateral wall portion 27c and is joined to the side sill inner 22. The inside reinforcing member 27 is arranged longitudinally along the side sill inner 22 of the side sill 20, thereby improving both performances of transmission and dispersion of the collision load in the offset frontal collision.

Figure 12:
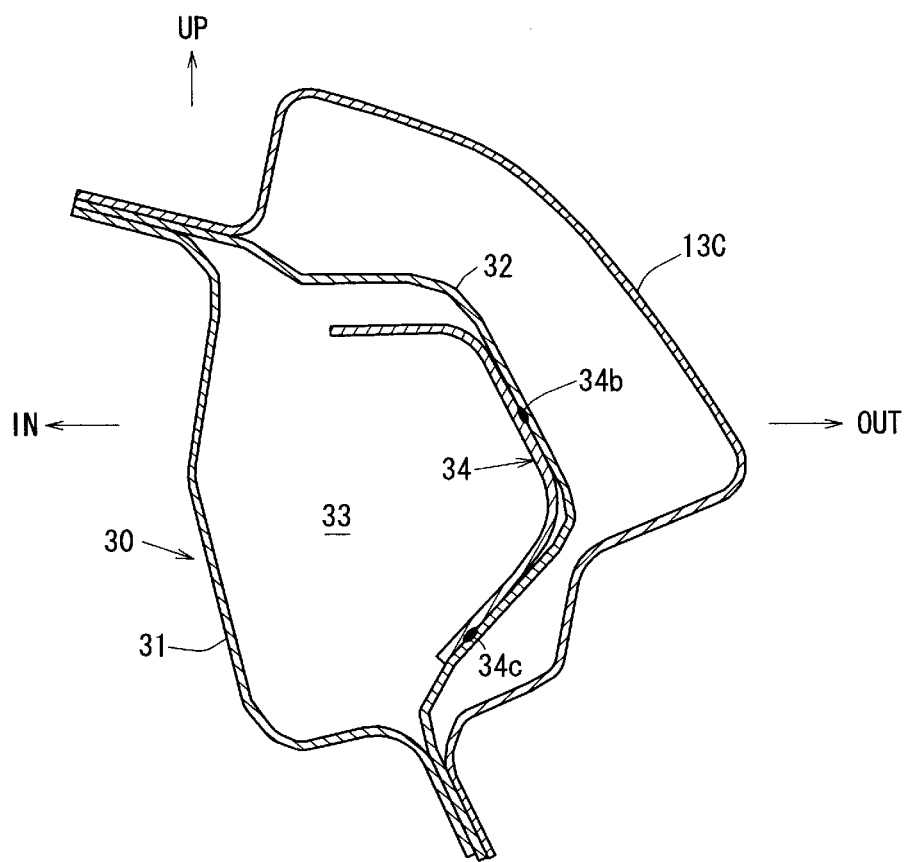
FIG. 12 is a sectional view taken along line E-E of FIG. 3.

FIG. 12 is a sectional view taken along line E-E of FIG. 3 (elevational view), and the front pillar 30 is a vehicle-body rigidity member which comprises a front pillar inner 31 and a front pillar reinforcement 32 which form a front pillar closed cross section 33 therebetween. Respective joint flange portions of a side frame outer 13C are fixedly joined to the front pillar 30 by spot welding. Each of the front pillar inner 31, the front pillar reinforcement 32 and the side frame outer 13C is formed to have a hat-shaped cross section in an elevational view. Herein, the side frame outer 13C can be formed integrally with the side frame outers 13A, 13B which form outer panels of the hinge pillar 10 and the side sill 20.

As shown in FIGS. 3 and 12, a fourth reinforcing member 34 is provided inside the front pillar 30. In the present embodiment, a steel plate having a U-shaped cross section is used as the fourth reinforcing member 34, the fourth reinforcing member 34 is arranged over a specified length of a central portion, in the longitudinal direction, of the front pillar 30 as shown in FIG. 3, and a front end 34a of the fourth reinforcing member 34 is located at a position corresponding to a steering wheel, not illustrated, thereby controlling a bending position (see FIG. 3) in the offset frontal collision of the vehicle (especially, in a small overlap collision).

That is, it is configured such that deformation of the front pillar 30 in the above-described offset collision is restrained by the fourth reinforcing member 34, thereby restraining the deformation of the front pillar 30 (bending buckling deformation) as well as restraining the hinge pillar 10 from falling inward and rearward, so that a space of the vehicle compartment can be properly ensured. Specifically, the bending position shown in FIG. 3 is set by positioning the front end 34a of the fourth reinforcing member 34 as described above, so that a bending length of the front pillar 30 in the offset collision is set to be relatively short between the hinge pillar 10 and the bending position, thereby restraining the hinge pillar 10 from falling inward and rearward. If the fourth reinforcing member 34 was not provided, the bending length of the font pillar 30 in the offset collision would be relatively long between the hinge pillar 10 and the center pillar 50, so that the hinge pillar 10 would fall inward and rearward greatly. Thus, the fourth reinforcing member 34 can properly restrain the falling of the hinge pillar 10.

As shown in FIG. 12, the fourth reinforcing member 34 is fixedly joined to an inside face of the front pillar reinforcement 32 at spot welding portions 34b, 34c. In FIG. 7, reference numeral 48 denotes a torque box. Herein, in the figures, an arrow F shows a vehicle forward direction, an arrow R shows a vehicle rearward direction, an arrow IN shows a vehicle inward direction, and an arrow OUT shows a vehicle outward direction, and an arrow UP shows a vehicle upward direction.

As described above, the lower vehicle-body structure of the vehicle of the present embodiment comprises the dash panel 1 extending in the vehicle width direction, the hinge pillar 10 connected to the end portion, in the vehicle width direction, of the dash panel 1, the side sill 20 connected to the lower portion of the hinge pillar 10 and extending in the vehicle longitudinal direction, the floor panel 2 connected to the side sill 20, the gusset member 9 provided in back of the front wheel and connecting the dash panel 1 and the hinge pillar 10, and the first reinforcing member 15 connected to the gusset member 9 to reinforce the lower portion of the hinge pillar 15 (see FIGS. 1 and 8).

According to the lower vehicle-body structure of the vehicle of the present embodiment, since the gusset member 9 which connects the dash panel 1 and the hinge pillar 10 is provided and the first reinforcing member 15 which is connected to the gusset member 9 and reinforces the lower portion of the hinge pillar 10 is provided, the hinge pillar 10 and the side sill 20 can be prevented from being displaced rearward by the gusset member 9 and the first reinforcing member 15 in the offset frontal collision (particularly, in the small overlap collision). Accordingly, the overall cabin deformation on the side of the vehicle's side portion can be restrained in the offset frontal collision of the vehicle, thereby ensuring the vehicle-compartment space.

Further, the first reinforcing member 15 comprises the upper-side reinforcing member 16 which is connected to the upper-side connection portion 9a of the gusset member 9 via the fastening member (see the bolts 18 and nuts 19) and arranged on the outward side, in the vehicle width direction, inside the hinge pillar 10 and connected to the side sill 20, and the lower-side reinforcing member 17 which is connected to the lower-side connection portion 9b of the gusset member 9 via the fastening member (see the bolts 28 and nuts 29) and connected to the side sill 20. Thereby, the reinforcement effect of the hinge pillar 10 can be increased by the upper-side reinforcing member 16 and the lower-side reinforcing member 17 which constitute the first reinforcing member 15 (see FIGS. 7 and 8). Further, the upper-side reinforcing member 16 connects the gusset member 9, the hinge pillar 10 and the side sill 20, and the lower-side reinforcing member 17 also connects the gusset member 9, the hinge pillar 10 and the side sill 20. Accordingly, the connection strength of the hinge pillar 10, the side sill 20 and the dash panel 1 is increased, thereby restraining a separate deformation of the hinge pillar 10 and the side sill 20 in the offset collision.

Further, the lower vehicle-body structure further comprises the second reinforcing members 44, 45, 46 which are arranged in the vehicle longitudinal direction along the side sill 20 and joint the inside frame member (see the inner reinforcement 21) of the side sill 20 and the floor panel 2. Thereby, it can be prevented by the second reinforcing members 44, 45, 46 that the joint portion of the side sill 20 and the floor panel 2 is disconnected. Accordingly, the overall cabin deformation on the side of the vehicle's side portion can be more properly restrained in the offset frontal collision of the vehicle, thereby ensuring the vehicle-compartment space.

Moreover, the lower vehicle-body structure further comprises the third reinforcing member 25 which is arranged in the vehicle longitudinal direction at the side sill 20. The third reinforcing member 25 includes the inside reinforcing member 27 which is arranged longitudinally along the inner face of the upper-side corner portion of the inside frame member (see the side sill inner 22) of the side sill 20 and forms the closed cross section 47 together with the inside frame member (see the side sill inner 22) of the side sill 20 (see FIG. 10). The above-described third reinforcing member 25 can properly prevent deformation of the side sill 20 and increase the performances of transmission and dispersion of the collision load in the offset frontal collision.

Also, a first closed cross section is formed by the gusset member 9 and the hinge pillar 10, a second closed cross section is formed by the first reinforcing member 15 and the hinge pillar 10, and a third closed cross section (see the closed cross section 47) is formed by the inside reinforcing member 27 and the side sill 20, respectively, in the sectional view perpendicular to the longitudinal direction of the side sill 20, and the first, second and third closed cross sections are overlapped in the vehicle longitudinal direction. Thereby, the rigidity can be further properly increased.

Herein, the above-described third reinforcing member 25 further includes the outside reinforcing member 26 which is arranged longitudinally along the outside frame member (see the outer reinforcement 23) of the side sill 20 and connected to the upper-side reinforcing member 16 (see FIG. 10).

The lower vehicle-body structure further comprises the front pillar 30 extending upward and rearward from the upper end portion of the hinge pillar 10 and the fourth reinforcing member 34 which is arranged inside the front pillar 30 (see FIGS. 1, 3 and 12). Thereby, the fourth reinforcing member 34 can restrain deformation (bending buckling deformation) of the front pillar 30 in the offset collision, and also restrain the hinge pillar 10 from falling rearward and inward, thereby ensuring the vehicle-compartment space.

The present invention should not be limited to the above-described embodiment, and any other modifications or improvements may be applied within the scope of a sprit of the present invention.

For example, while the outside reinforcing member 26 is split into the front outside reinforcing member 26F and the rear outside reinforcing member 26R in the above-described embodiment, it may be configured to a non-split member. Further, while the inside reinforcing member 27 (see FIGS. 1 and 11) is configured to a non-split member, it may be configured to be split members.

What is claimed is:

1. A lower vehicle-body structure of a vehicle, comprising:
a dash panel extending in a vehicle width direction;
a hinge pillar connected to an end portion, in the vehicle width direction, of the dash panel;
a side sill connected to a lower portion of the hinge pillar and extending in a vehicle longitudinal direction;
a floor panel connected to the side sill;
a gusset member provided in back of a front wheel and connecting the dash panel and the hinge pillar;
a first reinforcing member connected to the gusset member to reinforce the lower portion of the hinge pillar; said first reinforcing member comprising an upper-side reinforcing member which is connected to an upper-side connection portion of the gusset member via a fastening member and arranged on an outward side, in the vehicle width direction, inside the hinge pillar and connected to the side sill, and a lower-side reinforcing member which is connected to a lower-side connection portion of the gusset member via a fastening member and connected to the side sill; and
a third reinforcing member which is arranged in the vehicle longitudinal direction at said side sill, the third reinforcing member including an inside reinforcing member which is arranged longitudinally along an inner face of an upper-side corner portion of an inside frame member of the side sill and forms a closed cross section together with the inside frame member of the side sill; wherein a first closed cross section is formed by said gusset member and said hinge pillar, a second closed cross section is formed by said first reinforcing member and the hinge pillar, and a third closed cross section is formed by said inside reinforcing member and the side sill, respectively, in a sectional view perpendicular to a longitudinal direction of the side sill, and said first, second and third closed cross sections are overlapped in the vehicle longitudinal direction; said third reinforcing member further including an outside reinforcing member which is arranged longitudinally along an outside frame member of the side sill and connected to said upper-side reinforcing member.

2. The lower vehicle-body structure of a vehicle of claim 1, further comprising a second reinforcing member which is arranged in the vehicle longitudinal direction along the side sill and joints an inside frame member of the side sill and the floor panel.

3. The lower vehicle-body structure of a vehicle of claim 1, further comprising a front pillar extending upward and rearward from an upper end portion of the hinge pillar and a fourth reinforcing member arranged inside said front pillar.

* * * * *